No. 891,541.  
PATENTED JUNE 23, 1908.  
J. W. HASBURG.  
GAS ENGINE RELIEF VALVE.  
APPLICATION FILED MAR. 4, 1907.

Witnesses  
Harry R. L. White  
Ray White

Inventor  
John W. Hasburg  
By Forée Bain and May, Attys

UNITED STATES PATENT OFFICE.

JOHN W. HASBURG, OF CHICAGO, ILLINOIS.

GAS-ENGINE RELIEF-VALVE.

No. 891,541.　　　　　Specification of Letters Patent.　　Patented June 23, 1908.

Application filed March 4, 1907. Serial No. 360,333.

*To all whom it may concern:*

Be it known that I, JOHN W. HASBURG, a citizen of the United States, residing at Chicago, in the county of Cook and State of Illinois, have invented certain new and useful Improvements in Gas-Engine Relief-Valves, of which the following is a specification.

My invention relates to improvements in gas engine relief valves, and has for its primary object to provide a relief valve structure which will permit of the relief of compression upon the compression stroke of the engine piston, but will prevent the inspiration of air through such structure upon the inspiration stroke of the piston.

A further object of my invention is to provide a relief-valve construction embodying a priming cup, wherein the means for preventing inspiration of air through the relief valve operate to protect the priming cup from dust and dirt without materially interfering with the free use of the cup for priming purposes.

Yet a further object of my invention is to provide a relief-valve of the character described, involving a spring pressed check valve for the prevention of the inspiration of air during the inspiration stroke of the piston, wherein the spring tension on such check valve may be varied to adjust its resistance to the passage of the fluid from the engine cylinder and thereby regulate the relief operation of the valve.

Figure 1:
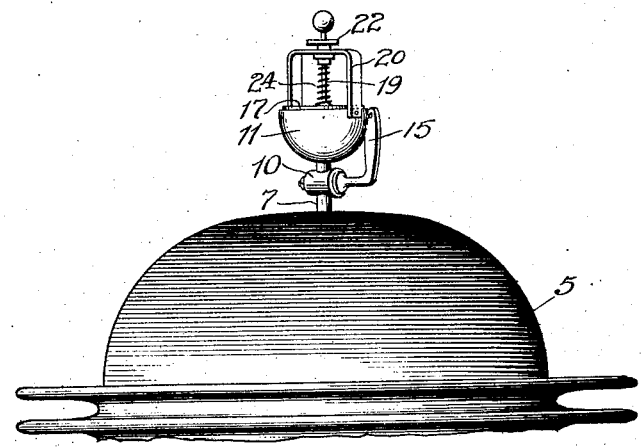
Figure 2:
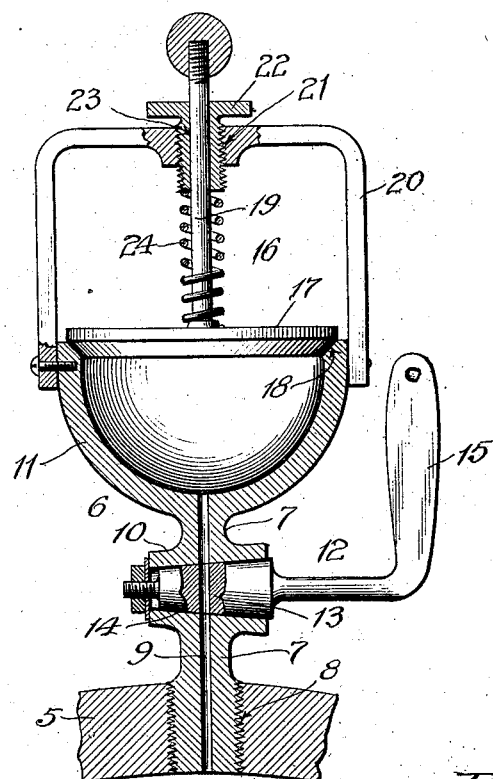

Other and further objects of my invention will become apparent to those skilled in the art from the following description taken in conjunction with the accompanying drawing, wherein:

Figure 1 is an elevation of a fragment of an engine cylinder, typical of any usual gas engine construction, equipped with a relief valve structure embodying my invention. Fig. 2 is a cross-sectional view of the relief valve greatly enlarged.

In said drawing, 5, indicates in general a gas engine cylinder, to which is attached at its combustion-chamber end the relief valve structure, comprising, in the embodiment shown, a body 6 consisting of a stem member 7, screw threaded as at 8 at its lower extremity for connection with the engine cylinder, and provided with longitudinal relief duct 9, a casing 10, for a rotary or oscillating primary valve, between the extremities of the stem 7, and a priming cup 11, into which the duct 9 opens.

12 indicates in general the primary relief valve, which is preferably a rotating or oscillating valve of ordinary construction, having its body portion 13 provided with an aperture 14 for registration when in one position with the duct 9, and adapted when turned to close said duct 9, and having any usual form of operating handle or equivalent device 15 for manual or non-automatic actuation.

The construction thus far described is itself operative as a relief valve structure, (although not in a practically satisfactory manner) the opening of the valve 12 permitting the escape of fluid from the engine during the compression stroke to permit the engine to be readily started, and the cup 11 providing a receptacle for gasolene or other priming material, which may be run through the duct 9 and valve port 14 into the cylinder. Such construction has in practice, however, great disadvantages, in that as the manual valve is open on the inspiration stroke as well as on the compression stroke of the piston, air is drawn into the cylinder on the inspiration stroke of the piston through the duct 9, such air varying from normal the quantity of the explosive mixture, and preventing the application of the usual "suction" to the ordinary intake valve. Furthermore, such inspiration of air brings with it dust and dirt, which may and commonly does accumulate in the cup 11, thus introducing into the cylinder of the engine foreign substances which are apt to deleteriously effect it. The salient feature of my invention lies, therefore, in the provision of an automatic check valve in association with the fluid passage through the relief valve structure, arranged to close during the inspiration stroke of the engine, and to open during the compression stroke of the piston; a further feature of my invention lying in the provision of such valve structure in association with the priming cup 11 in such manner as to effectively close such cup during the normal working of the engine, to keep therefrom all dirt and other impurities; and other features of my invention being the provision of an adjustable tension device for the valve, and an effective arrangement of parts whereby the structure may be cheaply manufactured and easily used.

In the specific embodiment of my invention herein illustrated for purposes of disclosure, 16 indicates in general the check valve structure, specifically comprising a valve proper 17, arranged to coact with the seat 18 formed at the inner edge of the rim of cup 11, and provided with a stem 19, positioned and guided by a suitable yoke 20, bridging the cup 11, and leaving free the major part of the periphery of such cup, so as to not interfere with the introduction of priming fuel.

The construction thus far described is itself operative, as the weight of the valve and its appurtenances may constitute of it a gravity check, and it will be apparent that if valve 12 be opened, pressure is developed in the chamber of cup 11 during the compression stroke of the piston, and the valve 17 will lift, permitting the relief desirable, while upon the inspiration strike of the piston the attendant reduction of pressure within the cup 11 will cause the valve 17 to seat firmly upon the properly shaped rim of the cup. Furthermore, it will be seen that in the normal operation of the engine when the primary relief valve 12 is closed, the valve 17 forms an effective closure for the cup 11 to keep dirt and other foreign substances therefrom. Obviously however, when it is desirable to prime the engine in starting it the valve 17 may be manually lifted and the proper quantity of fluid poured into the cup 11 to trickle down into the cylinder through the duct 9 in the usual manner. I prefer, however, that the valve 17 should be spring pressed, and as a further refinement of my invention I provide means for adjusting the spring tension so that the opposition of the valve 17 to opening may be readily regulated. To this end the guide or bridge 20 is centrally threaded as at 21, and the threaded bushing 22, apertured as at 23, for the reception in sliding relation of the valve rod 19, is screwed into the threaded portion 21, and between such adjustable bushing 22 and the valve body 17, is arranged a coil spring 24. Now it will be apparent that by the vertical adjustment of the bushing 22 in the stationary yoke 20, the tension on spring 24 may be varied and the desired resistance to opening movements of the valve 17 secured.

Obviously, on a multiple cylinder engine, the several primary relief valves 12 may be connected through their handles for simultaneous operation, the check valves needing no connection.

While I have herein described in some detail an operative embodiment of my invention I do not desire to be understood as limiting myself to the exact construction shown and described, as changes in construction may readily be made without departure from the spirit and scope of my invention.

Having thus described my invention, what I claim and desire to secure by Letters Patent, of the United States, is:

In a relief valve structure, a body having a duct therethrough, and provided with a priming cup into which said duct leads, a manual rotary valve controlling said duct, a bridge member spanning the cup, an outwardly opening spring-pressed check valve guided with respect to said bridge member and seating on the rim of said cup.

In testimony whereof I hereunto set my hand in the presence of two witnesses.

JOHN W. HASBURG.

In the presence of—
GEO. T. MAY, Jr.,
MARY F. ALLEN.